United States Patent [19]
Isokawa

[11] 3,771,022
[45] Nov. 6, 1973

[54] OVERVOLTAGE PROTECTIVE CIRCUIT

[75] Inventor: Chiaki Isokawa, Sagamihara-shi, Japan

[73] Assignee: Kabushiki Kaisha Sankosha, Tokyo, Japan

[22] Filed: Feb. 12, 1973

[21] Appl. No.: 331,523

[30] Foreign Application Priority Data
Feb. 20, 1972 Japan..........................47/017382
Mar. 4, 1972 Japan..........................47/022487
Apr. 13, 1972 Japan..........................47/036435

[52] U.S. Cl. .................................. 317/52, 317/61.5
[51] Int. Cl. ........................................... H02h 3/22
[58] Field of Search...................... 317/31, 61, 61.5, 317/62, 52, 20, 43; 179/184

[56] References Cited
UNITED STATES PATENTS
2,896,128  7/1959  Fuller.................................... 317/61
1,799,174  4/1931  Love...................................... 317/61
2,789,254  4/1957  Bodle..................................... 317/61

Primary Examiner—J. D. Miller
Assistant Examiner—Harvey Fendelman
Attorney—Richard P. Albert

[57] ABSTRACT

A first pair of oppositely poled diodes are connected in series across at least one pair of lines along which a signal is transmitted to an equipment to be protected. A second pair of reversely poled diodes are connected in series across the lines. Overvoltage responsive elements are connected between the respective junctions of the series diodes in the respective groups and the ground.

6 Claims, 5 Drawing Figures

OVERVOLTAGE PROTECTIVE CIRCUIT

BACKGROUND OF THE INVENTION

The invention relates to an overvoltage protective circuit which prevents damages to electronic equipment such as communication equipment connected to usual or d. c. supplied communication lines or control lines upon occurrence of an abnormally high voltage thereon as may be caused by lightning or induction from high voltage power transmission line.

As is known, a voltage surge in excess of several thousand volts may be caused on a communication line by lightning or induction from a power trnsmission line. Since recent design of an equipment for connection with the communication line involves the use of semiconductors, it is inherently susceptible to damage in response to a voltage surge across the line terminals on the order of tens of volts. In the event a voltage surge on the order of thousand volts occurs, the equipment connected with the line will be drastically destructed, and hence it is necessary to protect the equipment by immediately removing the overvoltage energy upon occurrence thereof.

One protective means against overvoltage is disclosed in U. S. Pat. No. 2,789,254, but it finds application only in telephone lines and communication lines and cannot be used where the communication line is superimposed with d. c. voltage to provide power supply. In case of a carbon block protector, it presents a low impedance upon its operation, thereby causing a short circuit of d. c. supply voltage as well as the signal to be transmitted, with the result that a reliable operation of communication service is prevented.

Therefore, it is a principal object of the invention to provide an overvoltage protective circuit which prevents the short-circuiting phenomenon even in the communication line fed with d. c. supply and, upon occurrence of an abnormally high voltage energy, removes only such energy to ensure a reliable communication service.

It is another object of the invention to provide an economical overvoltage protective circuit capable of removing an overvoltage energy from multiple communication lines by using a minimum number of overvoltage protective elements.

It is a further object of the invention to provide an overvoltage protective circuit capable of removing an overvoltage energy caused by lightning or induction regardless of the polarity of such energy.

It is still another object of the invention to provide an overvoltage protective circuit capable of suppressing any remaining overvoltage energy across communication lines below ten volts.

It is a still further object of the invention to provide an overvoltage protective circuit which prevents a high residual voltage across the lines even if a pair of overvoltage responsive elements such as carbon block protectors connected across the lines involve a time lag relative to each other in its operation.

SUMMARY OF THE INVENTION

The overvoltage protective circuit according to the invention comprises a first pair of oppositely poled diodes connected in series across a pair of signal transmission lines across which an equipment to be protected is connected, a second pair of reversely poled diodes connected in series across the pair of lines, and overvoltage responsive elements responsive to an overvoltage and connected between the junctions between the series connected diodes of the first and second pair and the ground.

BRIEF DESCRIPTION OF THE DRAWINGS

Above and other objects, features and advantages of the invention will be better understood from the following detailed description with reference to the drawings, in which.

DETAILED DESCRIPTION OF THE INVENTION

Figure 1:
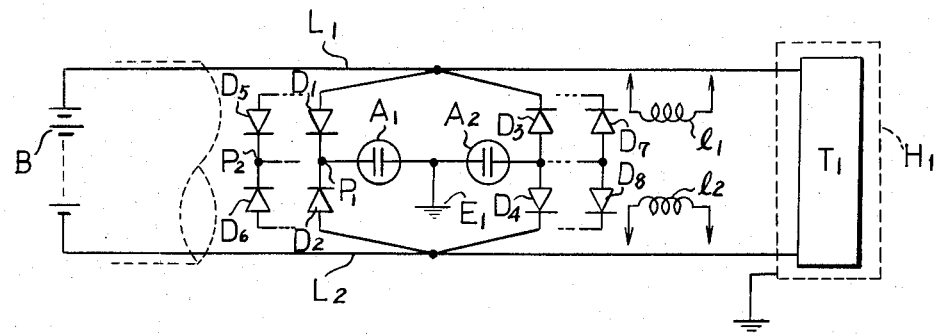
FIG. 1 is a circuit diagram of one embodiment of the overvoltage protective circuit according to the invention.

Referring to the drawings, and initially FIG. 1, there is shown a pair of lines $L_1$ and $L_2$ which are connected at one end with the positive and negative terminals of a d. c. source B, respectively.

The other end of each line $L_1$ and $L_2$ is connected with an electronic equipment $T_1$ to be protected, which usually comprises semiconductor elements such as transistors. The equipment $T_1$ is contained in a housing $H_1$. A pair of diodes $D_1$ and $D_2$ are connected in series across the lines $L_1$ and $L_2$, with the diodes being oppositely poled, that is, the cathodes of the respective diodes being connected together, either directly or through a component. Similarly, another pair of oppositely poled diodes $D_5$ and $D_6$ are connected in series across the lines $L_1$ and $L_2$. In this manner, there are provided a plurality of series diode circuits in which the cathodes of the diodes are connected together.

In addition, a further pair of diodes $D_3$ and $D_4$ are connected across the lines $L_1$ and $L_2$ in a manner such that their anodes are connected together either directly of through a component. For the purpose of convenience, such a pair of diodes will be referred to herein as "reversely connected diodes." In like manner, a fourth pair of diodes $D_7$ and $D_8$ are "reversely" connected in series across the lines $L_1$ and $L_2$, thereby forming a plurality of reversely connected series diode circuits thereacross.

The junctions of the respective series diode circuits, that is, the junction $P_1$ between the diodes $D_1$ and $D_2$ and the junction $P_2$ between the diodes $D_5$ and $D_6$, or the junction $P_3$ between the diodes $D_3$ and $D_4$ and the junction $P_4$ between the diodes $D_7$ and $D_8$ are coupled together, and are connected to the ground by means of overvoltage responsive elements $A_1$ and $A_2$. In the embodiment shown, these elements are connected between the junctions $P_1$ and $P_3$ and the ground shown at $E_1$. The overvoltage responsive elements $L_1$ and $L_2$ operate in response to an overvoltage in excess of a given value appearing across the lines $L_1$ and $L_2$, and may comprise gas-filled discharge tube, semiconductor element such as varistor, semiconductor switching element such as thyristor or the like.

In operation, assuming that a voltage surge of positive polarity is applied to the lines $L_1$, $L_2$ by lightning or other reason, the voltage surge is shunted through the diodes $D_1$ and $D_2$ ( and also through the diodes $D_5$ and $D_6$ ) to be applied across the overvoltage responsive element $A_1$, whereby the latter operates to discharge the overvoltage energy on the lines $L_1$ and $L_2$ to the ground, thereby rapidly removing such energy from the lines $L_1$ and $L_2$ and protecting the electronic equipment $T_1$ against the overvoltage energy. Assuming a voltage surge of negative polarity applied to the lines $L_1$ and $L_2$, the voltage surge is now shunted through the diodes $D_3$ and $D_4$ ( and also through the diodes $D_7$ and $D_8$ ) to be applied across the overvoltage responsive element $A_2$, whereby the latter operates, thereby establishing a path to discharge the voltage surge to the ground including diodes $D_3$, $D_4$, $D_7$ and $D_8$ and the overvoltage responsive element $A_2$. Thus the voltage surge on the lines $L_1$ and $L_2$ are instantaneously removed, affording protection of the electronic equipment $T_1$ against the overvoltage.

Since in this embodiment, a single overvoltage responsive element $A_1$ is connected between the junction $P_1$ and the ground $E_1$ and a single overvoltage responsive element $A_2$ is connected between the junction $P_3$ and the ground $E_1$, any voltage surge occurring across the lines $L_1$ and $L_2$ is removed by the operation of the overvoltage responsive element $A_1$ or $A_2$ regardless of the magnitude of such energy, without causing a residual voltage of substantial value across the lines $L_1$ and $L_2$ as a result of differential time log in the operation of respective protectors as would be the case if a pair of carbon block protectors are connected across the lines as illustrated by the aforementioned U. S. Patent. It is found by experiments that the invention permits a residual voltage to be suppressed as low as several volts.

A time lag from the application of a voltage surge to the overvoltage responsive element $A_1$ or $A_2$ until its operation may result in the voltage appearing across the respective lines $L_1$, $L_2$ and the ground $E_1$ being applied across the lines $L_1$, $L_2$ and the grounded housing $H_1$ of the electronic equipment $T_1$. In such instances, neutralizing coils $l_1$ and $l_2$ may be connected between the lines $L_1$, $L_2$ and the electronic eqipment $T_1$. For a signal current circulating through the lines $L_1$, $L_2$, the neutralizing coils $l_1$ and $l_2$ have a cancelling effect and do not present an impedance, while presenting a substantial impedance to a surge current which passes only in one direction, thereby serving to bear instantaneously the voltage surge occurring across the respective lines $L_1$, $L_2$ and the ground $E_1$. Subsequently either the combination of the diodes $D_1$, $D_2$ and the overvoltage responsive element $A_1$ or the combination of the diodes $D_3$, $D_4$ and the overvoltage responsive element $A_2$ functions as a protective circuit to remove the voltage born by the coils, thereby preventing the breakdown of the electronic equipment $T_1$.

Because the diodes $D_3$ and $D_7$ connected to the positive terminal of the d. c. source B as well as the diodes $D_2$ and $D_6$ connected to the negative terminal of the d. c. source are poled so as not to conduct current from and to the source, the d. c. source B cannot be short-circuited when the withstand voltage of these diodes are chosen higher than the normal voltage supplied to the electronic equipment $T_1$ from the source B.

Figure 2:
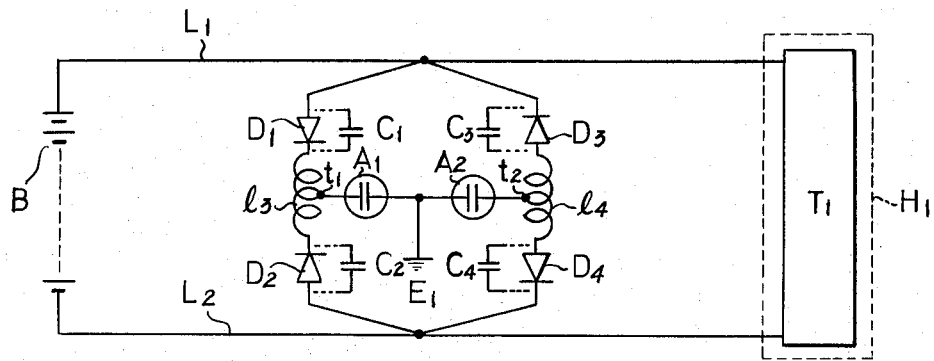
FIG. 2 to 5 are circuit diagrams of other embodiments of the overvoltage protective circuit of the invention.

FIG. 2 shows a second embodiment of the overvoltage protective circuit of the invention, and in this Figure, corresponding parts are designated by like reference characters as used in FIG. 1 and will not be described again. This embodiment is adapted to avoid the loss of the signal to be transmitted along the lines $L_1$, $L_2$ which will be of significant value when the signal is of high frequency on the order of hundred kilohertz to several megahertz by virtue of the capacitance across the electrodes of the diodes $D_1$ to $D_8$ shown in FIG. 1. This embodiment differs from the previous embodiment principally in the provision of coils $l_3$ and $l_4$ between the diodes $D_1$ and $D_2$ and between the diodes $D_3$ and $D_4$, respectively. These coils have taps $t_1$ and $t_2$ intermediate their ends, the taps being connected to the ground $E_1$ through the overvoltage responsive elements $A_1$ and $A_2$, respectively. The coils $l_3$ and $l_4$ are arranged for close coupling through the taps $t_1$ and $t_2$, thereby obtaining a mutual induction.

In operation, assuming a voltage surge of positive polarity occurred on the lines $L_1$ and $L_2$, it is applied from the line $L_1$ through the diode $D_1$ and the coil $l_3$ to the overvoltage responsive element $A_1$ and also from the line $L_2$ through the diode $D_2$ and the coil $l_3$ to the overvoltage responsive element $A_1$, whereby the latter operates to discharge the voltage surge to the ground $E_1$. Similarly, when a voltage surge of negative polarity occurred on the lines $L_1$, $L_2$, it is applied through the respective diodes $D_3$, $D_4$ and the coil $l_4$ to the overvoltage responsive element $A_2$ to cause it to operate, thereby discharging the voltage surge to the ground and protecting the electronic equipment $T_1$ against damage by the voltage surge.

During normal operation, when a transmission signal of high frequency is transmitted along the lines $L_1$, $L_2$ to the electronic equipment $T_1$, the capacitance across the junction of the diodes $D_1$ to $D_4$ is no longer negligible. These Capacitances are represented in FIG. 2 by equivalent capacitors $C_1$, $C_2$, $C_3$ and $C_4$ in shunt with the respective diodes. As a consequence, the high frequency signal transmitted along the lines $L_1$, $L_2$ would tend to flow across these lines through a series combination of $C_1$ and $C_2$ or $C_3$ and $C_4$, thereby resulting in a short-circuit across the lines $L_1$ and $L_2$ for the transmission signal. However, the presence of the coils $l_3$ and $l_4$ connected between the diodes $D_1$ and $D_2$ and between the diodes $D_3$ and $D_4$ respectively, presents an impedance to such flow of the transmission signal, thereby preventing such flow. Thus the high frequency transmission signal is transmitted to the electronic equipemnt $T_1$ without being by-passed through the capacitors $C_1$ to $C_4$ across the lines.

Upon occurrence of a voltage surge on the lines $L_1$, $L_2$ to operate the overvoltage responsive element $A_1$ or $A_2$ which discharges the surge to the ground $E_1$, it will be understood that the surge currents flow into the tap $t_1$ or $t_2$ in opposite directions so that the inductance which the coil $l_3$ or $l_4$ presents is cancelled. Thus the coils $l_3$ and $l_4$ do not present an impedance to a surge current, while as mentioned previously, they present an impedance to the transmission signal, thereby preventing a short-curcuiting of the lines for the latter. In this manner, the embodiment shown in FIG. 2 prevents the loss of high frequency transmission signal during the normal operation and facilitates removal of a voltage surge upon occurrence thereof.

Figure 3:
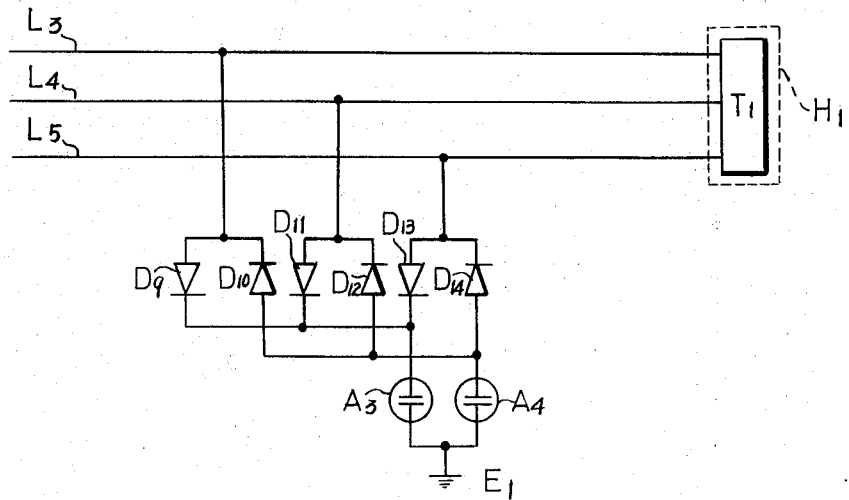

FIG. 3 shows a third embodiment of the invention wherein more than two lines, illustrated as $L_3$, $L_4$ and $L_5$ are connected with the electronic equipment $T_1$. Each of these lines is connected with the anode of respective diode $D_9$, $D_{11}$, $D_{13}$, the cathode of which is connected together and is connected to the ground $E_1$ through an overvoltage responsive element $A_3$. These lines $L_3$ to $L_5$ are also connected with the cathode of respective diodes $D_{10}$, $D_{12}$, $D_{14}$, the anodes of which are connected in common and to the ground $E_1$ through another overvoltage responsive element $A_4$.

In operation, assuming that a voltage surge of positive polarity occurred on the line $L_3$, for example, this voltage surge is applied through diode $D_9$ to the overvoltage responsive element $A_3$, which operates to discharge the voltage surge to the ground $E_1$. A voltage surge of negative polarity occurring on the line $L_3$ is conducted through the diode $D_{10}$ to operate the other overvoltage responsive element $A_4$, which also serves discharging the voltage surge to the ground $E_1$. In this manner, a voltage surge of either polarity is instantaneously discharged to the ground, thus protecting the electronic equipment $T_1$ from damage by the voltage surge. It will be readily appreciated that the above description applies to the occurrence of a voltage surge on other lines.

In the embodiment of FIG. 3, it will be noted that the circuit arrangement is advantageously simplified since a pair of overvoltage responsive elements are sufficient for any increased number of lines. Since either one of the overvoltage responsive element $A_3$ or $A_4$ is operative in response to the polarity of the voltage surge on the respective lines $L_3$ to $L_5$, and the use of a pair of simultaneously operated overvoltage responsive elements (in response to a voltage surge of same polarity) is avoided, there is no need to cater for the differential time log in the operation of the elements and thus a minimized residual overvoltage across the lines is assured.

Figure 4:
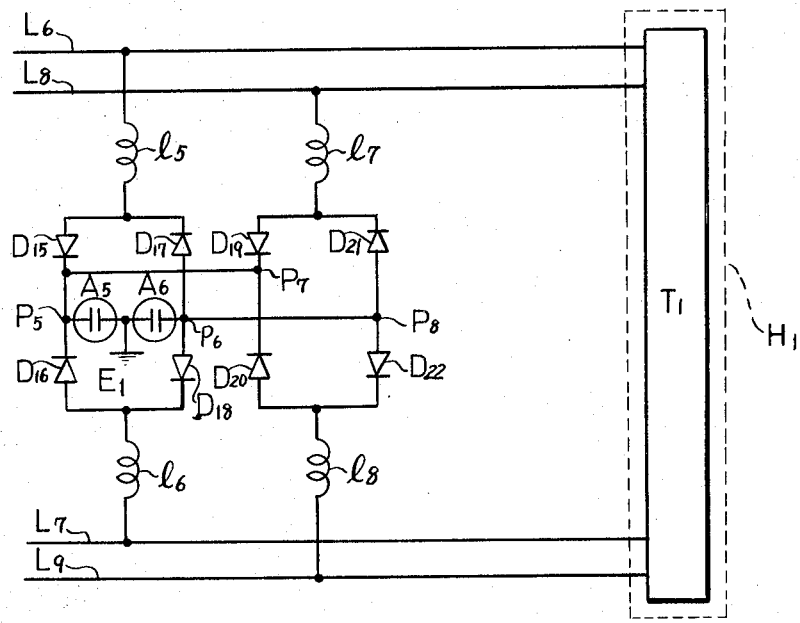

FIG. 4 shows a fourth embodiment of the invention which incorporates the arrangements of FIGS. 2 and 3 together. Specifically, four lines $L_6$, $L_7$, $L_8$ and $L_9$ are provided, with coil $l_5$, diodes $D_{15}$ and $D_{16}$ (these diodes being oppositely poled, that is, their cathode being connected together) and coil $l_6$ being connected in series across the lines $L_6$ and $L_7$. The junction $P_5$ between the diodes $D_{15}$ and $D_{16}$ is connected to the ground $E_1$ through an overvoltage responsive element $A_5$. The series circuit comprising the diodes $D_{15}$ and $D_{16}$ is shunted by another series circuit comprising diodes $D_{17}$ and $D_{18}$. These diodes $D_{17}$ and $D_{18}$ are reversely poled, that is, their anodes are connected together, and the junction $P_6$ between them is connected to the ground $E_1$ through another overvoltage responsive element $A_6$.

Similarly, a coil $l_7$ diodes $D_{19}$ and $D_{20}$ and a coil $l_8$ are connected in series across the lines $L_8$ and $L_{10}$. The diodes $D_{19}$ and $D_{20}$ are oppositely poled and the junction $P_7$ therebetween is counted with the junction $P_5$ mentioned above. The series circuit comprising the diodes $D_{19}$ and $D_{20}$ is shunted by a series circuit comprising diodes $D_{21}$ and $D_{22}$, with these diodes being reversely poled, that is their anodes being connected together, and the junction $P_8$ between them being connected with the junction $P_6$.

In operation, upon occurrence of a voltage surge of positive polarity on the lines $L_6$ and $L_7$, the surge current is discharged from the line $L_6$ through the coil $l_5$, diode $D_{15}$ and the overvoltage responsive element $A_5$ to the ground $E_1$ and the surge current is discharged from the line $L_7$ through the coil $l_6$, diode $D_{16}$ and the overvoltage responsive element $A_5$ to the ground $E_1$. Similarly, upon occurrence of a voltage surge of positive polarity on the lines $L_8$ and $L_9$, the surge current is discharged from the line $L_8$ through the coil $l_7$, diode $D_{19}$ and the overvoltage element $A_5$ to the ground $E_1$ and the surge current is discharged from the line $L_9$ through the coil $l_8$, diode $D_{20}$ and the overvoltage responsive element $A_5$ to the ground $E_1$. Upon occurrence of a voltage surge of negative polarity on respective lines $L_6$ to $L_9$, the surge current is discharged to the ground through the respective paths including the line $L_6$, coil $l_5$, diode $D_{17}$ and overvoltage responsive element $A_6$, including the line $L_7$, coil $l_6$, diode $D_{18}$ and overvoltage responsive element $A_6$, including the line $L_8$, coil $l_7$, diode $D_{21}$ and overvoltage responsive element $A_6$, and including the line $L_9$, coil $l_8$, diode $D_{22}$ and overvoltage responsive element $A_6$.

The coil $l_3$ of FIG. 2 corresponds to the coils $l_5$ and $l_6$ in FIG. 4, and because the path including these coils includes at least one diode across each pair of lines, that is, across the lines ($L_6$ and $L_7$ or $L_8$ and $L_9$, which blocks the current flow therethrough, a short-circuiting of the power source through such path cannot occur, as was mentioned previously in connection with FIG. 2.

While in the embodiment of FIG. 4, the overvoltage responsive elements associated with the lines $L_8$ and $L_9$ which form a second channel are in common with the overvoltage responsive elements, shown at $A_5$ and $A_6$, associated with the lines $L_6$ and $L_7$ which form a first channel, separate overvoltage responsive elements may be associated with the respective channels.

Figure 5:
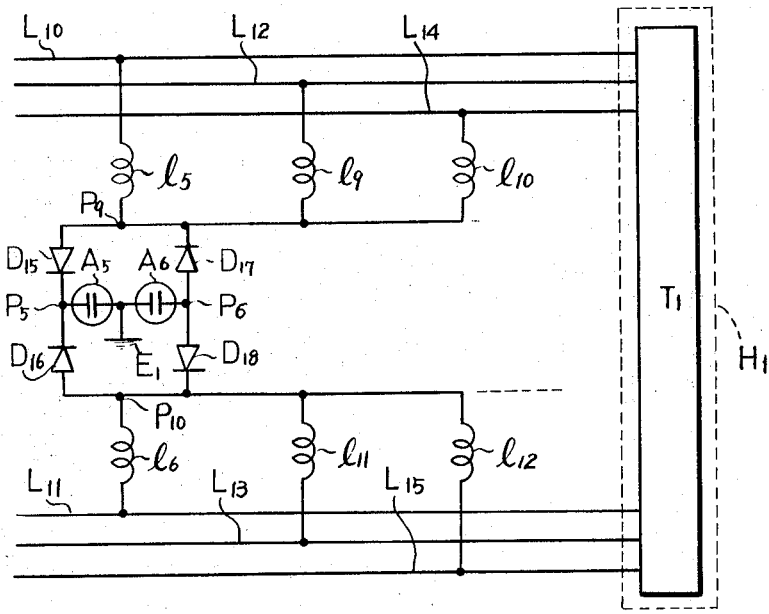

FIG. 5 shows a fifth embodiment of the invention for a three channel system. A first channel is formed by a pair of lines $L_{10}$ and $L_{11}$, and the diodes and overvoltage responsive elements connected across the lines of the pair are shared by a second channel formed by lines $L_{12}$ and $L_{13}$ and by a third channel formed by lines $L_{14}$ and $L_{15}$. The circuit arrangement connected across the lines of the first channel is identical with that shown in FIG. 4 across the lines $L_6$ and $L_7$ of the first channel, and therefore its corresponding components are designated by like reference characters as in FIG. 4 and will not be reiterated.

In FIG. 5, coils $l_9$ and $l_{10}$ are connected between the lines $L_{12}$ and $L_{14}$, respectively, and the junction $P_9$ between the coil $l_5$ and diodes $D_{15}D_{17}$, and coils $l_{11}$ and $l_{12}$ are connected between the lines $L_{13}$ and $L_{15}$, respectively, and the junction $P_{10}$ between the coil $l_6$ and the diodes $D_{16}$, $D_{18}$.

In this manner while three channels are used, a circuit arrangement for a single channel can be shared by two other channels when the diodes $D_{15}$ to $D_{18}$ and the overvoltage responsive elements $A_5$, $A_6$ are chosen to have sufficient current capacity, thereby simplifying the overall circuit arrangement to an economical advantage. Because the lines $L_{10}$ and $L_{11}$ of the first channel, the lines $L_{12}$ and $L_{13}$ of the second channel and the lines $L_{14}$ and $L_{15}$ of the third channel are interconnected by way of coils $l_5$, $l_9$, $l_{10}$ and coils $l_6$, $l_{11}$, $l_{12}$, there is no possibility of shortcircuiting the power source or the transmission signal across the channels.

What is claimed is:

1. An overvoltage protective circuit for use with at least one pair of lines along which a signal is transmitted to an equipment to be protected, comprising a first pair of oppositely poled diodes connected in series across the lines, a second pair of reversely poled diodes connected in series across the lines, and a pair of overvoltage protective elements connected between the junction between the series diodes of the respective pairs and the ground and responsive to an overvoltage occurring on the line or lines to discharge the overvoltage to the ground.

2. An overvoltage protective circuit according to claim 1, further including neutralizing coils connected in series between the respective lines and the equipment to be protected.

3. An overvoltage protective circuit according to claim 1 in which the diodes of the first pair are connected in series across the lines through a coil having an intermediate tap, and in which the diodes of the second pair are connected in series across the lines through a further coil having an intermediate tap, said pair of overvoltage responsive elements being connected between the intermediate taps on the respective coils and the ground.

4. An overvoltage protective circuit for use with at least three lines along which a signal is transmitted to an equipment to be protected, comprising a first pair of diodes having their anode connected to each of the lines, a first overvoltage responsive element connected between the cathode of each of the diodes in the first pair and the ground and responsive to an overvoltage occurring on any of the lines to discharge the overvoltage to the ground, a second pair of diodes having their cathode connected to each of the lines, and a second overvoltage responsive element connected between the anode of each of the diodes in the second pair and the ground and responsive to a further overvoltage of opposite polarity to that of the first mentioned overvoltage occurring on any of the lines to discharge said further voltage to the ground.

5. An overvoltage protective circuit for use with a plurality of lines forming at least two channels along which a signal is transmitted to an equipment to be protected, said circuit comprising a first pair of oppositely poled diodes connected in series across a pair of lines forming a first channel through a first and a second coil arranged for mutual induction therebetween, a second pair of reversely poled series diodes connected in parallel with the first pair of diodes, a first overvoltage responsive element connected between the junction of the series diodes in the first pair and the ground and responsive to an overvoltage occurring on the lines of the first channel to discharge the overvoltage thereon to the ground, a second overvoltage responsive element connected between the junction of the series diodes in the second pair and the ground and responsive to a further overvoltage of opposite polarity to that of the first mentioned overvoltage occurring on the lines of the first channel to discharge said further overvoltage thereon to the ground, a third pair of oppositely poled diodes connected in series across a further pair of lines forming a second channel through a third and a fourth coil arranged for mutual induction therebetween, the junction of the series diodes in the third pair being connected with the junction of the series diodes in the first pair, and a fourth pair of reversely poled series diodes connected in parallel with the third pair of diodes, the junction of the series diodes in the fourth pair being connected with the junction of the series diodes in the second group.

6. An overvoltage protective circuit for use with a plurality of lines forming at least two channels along which a signal is transmitted to an equipment to be protected, said circuit comprising a first pair of oppositely poled diodes connected in series acorss a pair of lines forming a first channel through a first and a second coil arranged for mutual induction therebetween, a second pair of reversely poled series diodes connected in parallel with the first pair of diodes, a first overvoltage responsive element connected between the junction of the series diodes in the first pair and the ground and responsive to an overvoltage occurring on the lines of the first channel to discharge the overvoltage thereon to the ground, a second overvoltage responsive element connected between the junction of the series diodes in the second pair and the ground and responsive to a further overvoltage of opposite polarity to that of the first mentioned overvoltage occurring on the lines of the first channel to discharge said further overvoltage thereon to the ground, a pair of coils connected between one of the lines forming pairs which constitute channels other than said first channel and the junction between the first coil and the first and second pairs of diodes and a further group of coils connected between the other of the lines forming said pairs and the junction between the second coil and the first and second pairs of diodes.

* * * * *